C. A. SPICKLER.
ADJUSTABLE LINER.
APPLICATION FILED NOV. 20, 1915.
1,241,675. Patented Oct. 2, 1917.
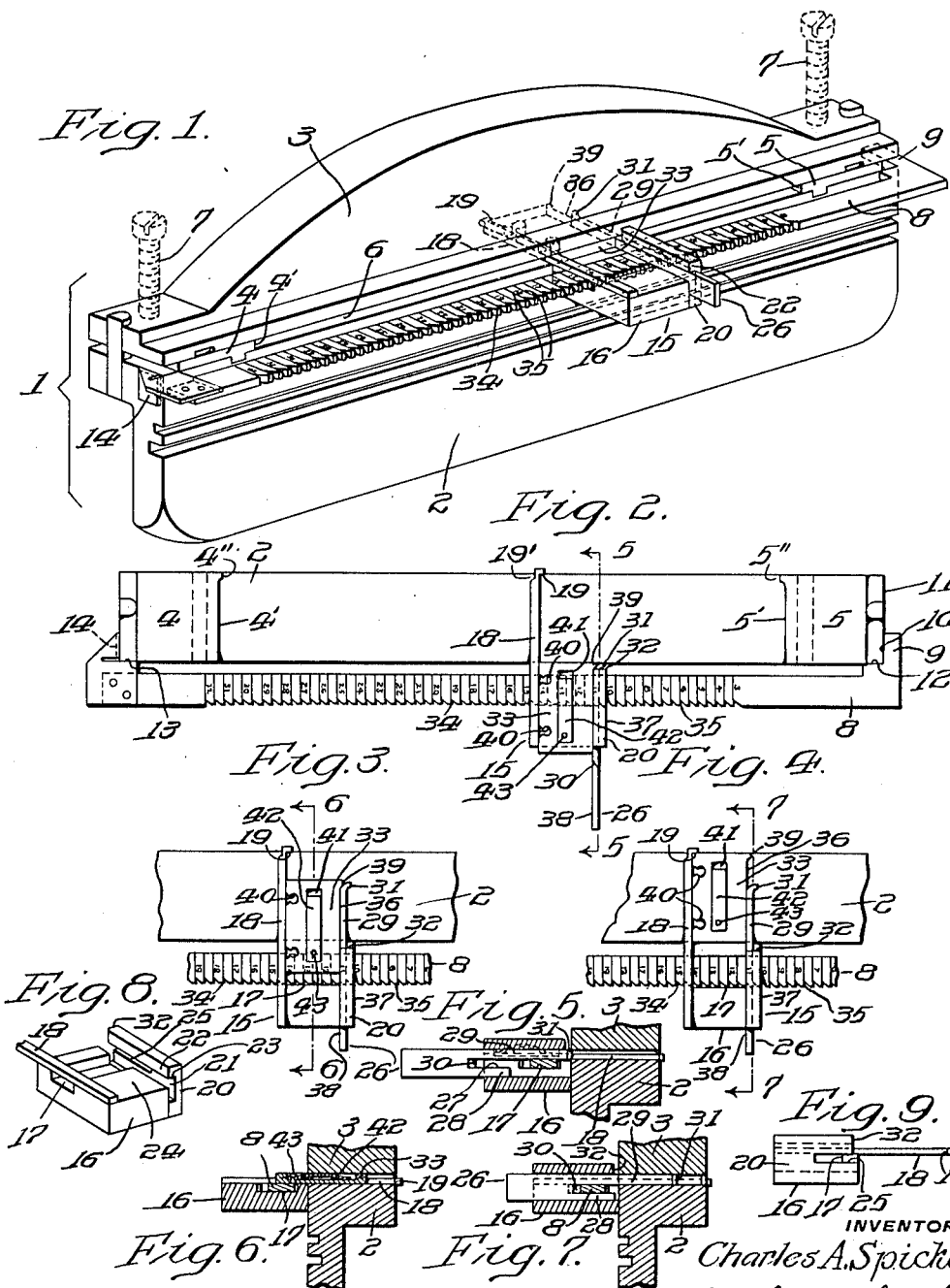
WITNESS
F. J. Hartman.
INVENTOR
Charles A. Spickler.
BY
Fenton v Bhurt
ATTORNEYS

UNITED STATES PATENT OFFICE.

CHARLES A. SPICKLER, OF PHILADELPHIA, PENNSYLVANIA.

ADJUSTABLE LINER.

1,241,675.         Specification of Letters Patent.         Patented Oct. 2, 1917.

Application filed November 20, 1915. Serial No. 62,670.

*To all whom it may concern:*

Be it known that I, CHARLES A. SPICKLER, a citizen of the United States, and a resident of the city of Philadelphia, county of Philadelphia, and State of Pennsylvania, have invented certain new and useful Improvements in Adjustable Liners, of which the following is a full, clear, and exact disclosure.

My invention relates to adjustable liners, and more particularly to a liner comprising an implement which is independent of and adjustable with respect to the mold of line-casting machines. Heretofore it has been attempted to provide structures for casting lines of variable length in a line-casting machine by means of a series of gages differing from each other by a predetermined and standard length, that is to say, each gage differing from the next gage in the series by one pica or by one-half a pica, said gages being inserted and clamped into the mold prior to casting a line in the unfilled portion of the mold, but such a series of gages is expensive, and one of the objects of my invention is to obviate the necessity of using such a series of gages.

It has also been attempted to adjust the line to be cast in a line-casting machine by inserting in a mold having provided therein transverse grooves or shoulders spaced from each other by distances of a pica or a half pica, a slug having therein coöperating grooves or ridges by means of which the slug is accurately positioned with respect to the mold to provide a space between the upper and lower halves of the mold equal to the line which it is desired to cast, but such constructions require a special mold and special slugs, all of which are expensive and objectionable.

One of the objects of my invention is to provide an implement, tool or gage by means of which a slug of standard width or length may be accurately placed between the upper and lower parts of the mold of a line-casting machine in any desired position; to provide a space between the slug and the right hand end of the mold of the proper length desired for casting a line of type of said length; and to provide a tool or implement which is readily attached and adjusted and is also removed and entirely separated from the mold, after the slug is positioned without disturbing the slug or changing the construction of the mold.

Further objects of my invention are to provide an implement to vary and adjust the substantial length of the mold slot in a line-casting machine; to obviate the necessity of using a graduated series of liner gages; to vary the substantial length of a mold of a line-casting machine without changing or altering or modifying the structure of the mold of a standard linotype machine itself; to provide a simple adjustable liner which can be used with substantially any standard line-casting machine for accurately positioning a stop-off slug between the upper and lower parts of a line-casting mold; to provide an adjustable liner which is separate from and independent of the mold structure and which is used for positioning a slug but which is itself separated from the mold, and is removable from the mold after the slug is so positioned; and to provide an adjustable liner which can be readily and almost instantly accurately adjusted to any effective length of line to be cast in a line-casting machine and by means of which a stop-off slug may be accurately placed in position in the mold.

Other objects of my invention will appear in the specification below.

Referring to the drawings forming a part of this application and in which the same reference characters are used throughout the various views to designate the same parts, Figure 1 is a perspective view of a standard mold of a line-casting machine showing my adjustable liner positioned with respect to the mold and showing in dotted lines a slug placed in the proper position between the upper and lower parts of the mold structure.

Fig. 2 is a plan view of my improved liner showing it in a position with respect to the lower part of the mold and showing a stop-off slug held in the instrument just prior to its insertion in the mold;

Fig. 3 is a fragmentary view of a portion of my implement and a portion of the lower portion of the mold, the view being similar to Fig. 2 but showing the slug as partly inserted in the mold and the slider of the mold locked in position with respect to the gage;

Fig. 4 is a view similar to Fig. 3 showing the slug fully inserted in the mold;

Fig. 5 is a transverse sectional view on the line 5—5 of Fig. 2 of my improved liner and of a portion of the mold, Fig. 5 showing the device in the same position as that shown in Fig. 2;

Fig. 6 is a view similar to Fig. 5, but showing the parts in position indicated in Fig. 3, the section being taken on the line 6—6 of Fig. 3;

Fig. 7 is a similar transverse sectional view of similar parts taken on the line 7—7 of Fig. 4 indicating the position of the parts when the slug is properly inserted in the mold;

Fig. 8 is a perspective view of the block and end plate coöperating therewith and a fragmentary portion of the rear or back guide carried by the block of the carrier; and Fig. 9 is an end view of the structure shown in Fig. 8.

A standard mold 1 of a line-casting machine is composed of a lower half or portion 2 and an upper half or portion 3 spaced from each other by liners 4, 5, to provide a slot 6 between the same, which slot constitutes the mold into which the molten metal is cast. The upper and lower parts 2 and 3 of the mold are held in fixed position with respect to each other by means of the usual clamping screws 7—7 extending through the disk or face plate (not shown) upon which the mold is mounted in a line-casting machine of ordinary construction.

The mold slot 6 is of a length to cast a line of type equal to the full capacity of the machine, but it often occurs that a line of a length less than that of which the machine is capable of casting, is required to be cast by the said machine. To do this, the rear liner 4 is removed and a different liner, the inner side (corresponding to 4′) of which, is nearer to the inner side 5′ of the liner 5, is substituted therefor to make a mold of such desired length. Such operation of a line-casting machine necessitates, of course, the employment of a complete set or series of liners 4, each differing from the next in the series by say one-half of a pica. It is to obviate the necessity of the use of such a series of liners that the present invention has for one of its objects.

My adjustable liner comprises a gage 8 having a projection 9 extending rearwardly and providing a shoulder 10 at right angles to the length of the gage, said shoulder being adapted to fit against the upper right hand end 11 of the lower portion 2 of the mold. It may here be stated that in a standard line-casting machine the distance between the right hand end 11 of the lower portion of the mold and the side 5′ of the liner 5 is constant and fixed, and that the fitting or placing of the shoulder 10 of the gage 8 against the end 11 of the mold will insure the accurate positioning of the gage with respect to the mold slot 6.

The gage 8 is also provided with a short shoulder or ledge 12 adapted to bear against the front side of the lower portion of the mold to space the inner edge of the gage proper from the face of the mold.

The opposite end of the gage 8 is also provided with a similar shoulder 13 which bears against the face of the mold and by means of the said shoulders 12 and 13 the gage is capable of being positioned parallel to the face of the mold.

Said opposite end of said gage 11 is preferably provided with a resilient clamping member 14 adapted to hold the shoulder 10 squarely and positively against the end 11 of the mold when the resilient clamping member 14 engages the left hand end of the lower portion 2 of the mold.

Mounted upon the gage 8 is the sliding carrier 15 which consists of a rectangular block 16 provided on its top side with a rectangular slot 17 within which the gage 8 snugly fits, the top surfaces of said block 16 and of said gage being flush with each other. Secured to the top of said block 16 and overlying the upper surface of said gage 8 is a finger 18 forming the rear or back guide member which projects rearwardly from said block, and the outer end of which is provided with a square shoulder 19 arranged to lie in the plane of the rear surface of said mold 1 when the gage 8 is properly positioned on said mold.

The right hand side of the block 16 is also provided with an end plate 20 having a rectangular recess 21 therein to provide an overhanging shoulder 22, the underside 23 of which is parallel to but spaced above the upper surface 24 of said block 16. Said end plate 20 is also provided with an open ended slot 25, the upper and lower sides of which are in the planes respectively of the upper and lower sides of the gage 8.

Fitted into said slot 21 is the slug inserting and carrier locking member 26 provided with an open ended slot 27 longitudinally thereof to provide a finger 28 adapted to slide under said gage 8, a finger 29 overlying said gage and a sharp chisel shaped locking edge 30 between said fingers. Said upper finger 29 is provided at its end with a lateral projection 31 adapted to engage the rear edge 32 of said end plate 20 when said slug inserting and locking member is drawn outwardly from the block 16 to its extreme position. It will thus be seen that the upper finger 29 and the rear or back guide 18 are arranged in the same plane with their under surfaces in engagement with the upper side of the gage 8. The vertical thickness of said finger 29 and said rear or back guide or finger 18 is slightly less than the width of the mold slot 6 when the same is arranged to cast type of the least vertical height of which the mold is capable of casting. The adjacent faces of the finger 29 and the rear or back guide 18 are exactly parallel to each other and are separated from each other by a distance exactly equal to the width of a stop-off slug 33 adapted to be inserted therebetween.

The front edge of the gage 8 is provided with teeth or notches 34, the left hand edge of each notch being preferably at right angles to the length of the gage 8 and the right hand side of each notch being preferably beveled as clearly indicated in Figs. 2, 3 and 4. The locking edge 30 of the slug inserting and locking member or finger 26 is preferably similarly beveled to accurately fit in the notches 34 of the gage. Said notches 34 are accurately spaced from each other and the distance between adjacent notches is preferably made to be in terms of one-half a pica or twelfths of an inch.

The top surface of the gage 8 is provided with graduations 35 corresponding to the notches or teeth 34 in the edge of said gage,—that is to say, the graduations are preferably half pica graduations. These graduations 35 are so positioned with respect to the gage 8 that when the slug 33 is inserted into the carrier 15 the right hand side edge 36 of the stop-off slug 33 is as far from the right hand inner side 5' of the mold slot 6 as that indicated on the gage by the registration of the right hand surface 37 of the end plate 20 with the graduations on the gage 8. In other words, the coincidence of the right surface 37 of the end plate 20 with a graduation 35 on the top of the gage 8 indicates the distance which the right hand side 36 of the slug 33 is from the end 5' of the mold slot 6. It, therefore, also indicates the distance between the inner side 5' of the mold slot 6 and the inner face 38 of the inserting locking member 26. Of course, the graduations might be so placed on the face of the gage 8 that any other edge or pointer on the carrier 15 might be used as the setting or indicating point. I find in practice, the right side 37 of the end plate 20 is most convenient for general purposes.

The stop-off slug 33 is provided at its inner end with a toe or projection 39 adapted to fit against the projection 31 of the upper finger 29 of the inserting and locking member 26 and is also preferably provided with recesses 40 into which the molten metal will flow and key itself during the first casting operation, as will be later described. The vertical thickness of the slug 33 is made to be exactly equal to the height of the mold 6 when the top 3 is firmly clamped to the bottom 2 of the mold by the screws 7—7 and if desired, the slug 33 may be provided with a recess 44 within which a leaf spring 42 is secured at one end by a screw or pin 43, said spring 42 being adapted to normally project slightly above the upper surface of the slug 33.

In using my adjustable liner, the inserting and locking member 26 is drawn outwardly to the position shown in Fig. 2 and a slug 33 is placed on the top of the block 16 and fitted between the adjacent sides of the back or rear guide 18 and the inserting or locking member 26 with its toe resting against the projection 31 of the upper finger 29. The implement is then manually placed against the face of the mold of a line casting machine with the projection 9 against the right hand end of the mold, the projections 12, 13 bearing against the face of the mold, the resilient spring or clip 14 pressing and holding the projection 9 against the right hand end of the mold, and the rear or back guide or finger 18 being inserted in the mold slot 6 of the mold. The sliding block or carrier 15 is then moved longitudinally of the gage 8 until the side surface 37 of the end plate 20 registers with the graduation on the top of the gage 8 indicative of the length of line which is to be cast. The sliding carrier having been adjusted to this position, the inserting and locking member 26 is pushed inwardly or rearwardly to the position indicated in Figs. 1 and 3 and this movement of said member 26 moves the upper finger 29, and the slug 33 carried thereby, into the position shown in Fig. 3 and also brings the locking edge 30 of the inserting and locking member 25 into a notch 34 corresponding to the graduation in coincidence with which is the right hand surface 37 of the end plate 20. This movement, therefore, locks the sliding carrier 15 with respect to the gage 8 and partially inserts the slug 33 in the mold slot 6. The slug 33 is then further pushed into the mold slot 6 by a screw driver or any other suitable implement until its rear edge comes into engagement with the projection 19 of the rear or back guide 18. The clamping screws 7 are then turned to clamp the top 3 firmly to the bottom 2 and at the same time to firmly clamp the slug 33 in position between the upper and lower sides of the mold. The inserting and locking member 26 is then drawn outwardly until the projection 31 strikes the inside edge 32 of the clamping plate 20, thus leaving the sliding carrier free to be moved slightly to the left to bring the projection 19 clear of the rear side of the slug 33 after which the implement as a whole may be manually withdrawn from the face of the mold, leaving the slug 33 securely clamped and accurately positioned with respect to the inner end 5' of the mold slot 6.

The wheel or disk (not shown) upon which the mold 1 is mounted and by means of which it is carried in the usual manner in mold casting machines is then turned to bring the mold into casting position. The first flow of metal fills that portion of the mold between the slug 33 and the edge 5' of the mold slot, and also fills that portion of the mold between the slug 33 and the opposite edge 4' of the mold slot. It will be observed that this first casting operation of the machine then will cause the molten metal to fill the openings or slots 39 as it fills that portion of the mold between the slot 33 and the end 4' of the mold slot, and that the metal so cast will thereafter keep said portion of the mold stopped off leaving only that portion of the mold between the end 5' and the right hand side of the slug 33 to coöperate with the matrices, which in the usual operation of linotype machines and other line-casting machines, are applied to the portion of the mold which is not so stopped off.

In the preferred form of my invention, the slug 33 is provided with a leaf spring 42 which tends to frictionally hold the slug in its adjusted position prior to the clamping of the top to the bottom of the mold, but such spring may be omitted if desired and an ordinary slug of a width equal to the distance between the adjacent surfaces of the rear or back guide 18 and the inserting or locking member 26 may be employed. This spring also greatly facilitates the holding of the slug or liner 33 in position whenever the mold is slightly warped and the slug may not be tightly clamped between the top and bottom parts of the mold even after the screws 7—7 have been set. Under such conditions, the spring 42 holds the slug or liner 33 in position during the first casting operation.

What I claim and desire to secure by Letters Patent is:

1. In an adjustable liner, the combination of a gage, means to hold said gage pressed against one end of a mold of a line-casting machine and parallel to the mold slot in said mold, a carrier slidable longitudinally of said gage, and means to lock said carrier to said gage in different positions and to simultaneously insert a stop-off slug into the mold.

2. In an adjustable liner, the combination of a gage, means to hold said gage pressed against the right hand end of a mold of a line-casting machine and parallel to the mold slot in said mold, a carrier slidable longitudinally of said gage, and means to lock said carrier to said gage in positions differing from each other in terms of one-half a pica and to simultaneously insert a stop-off slug into the mold at a distance from the right hand end of said mold equal to that indicated by the position of said carrier on said gage.

3. In an adjustable liner, a gage having half pica graduations thereon, means on said gage to position and hold said gage pressed against the right hand end of a mold of a line-casting machine and parallel to the mold slot in said mold, a carrier slidable longitudinally of said gage, means to lock said carrier to said gage in positions differing from each other in terms of half a pica and to simultaneously insert a stop-off slug into said mold at a distance from said right hand of said mold equal to that indicated by the position of said carrier on said gage.

4. In an adjustable liner, a gage having one-half pica graduations, a carrier mounted to slide longitudinally of said gage, means to lock said carrier at any predetermined point on said gage in positions differing from each other in terms of one-half a pica and to simultaneously slide a stop-off slug on said carrier transversely of said gage.

5. In an adjustable liner, a gage having one-half pica graduations and having surfaces adapted to fit against the front and ends of a line-casting mold, a carrier mounted to slide longitudinally of said gage and having a guiding member extending transversely rearwardly of said gage, a member spaced from and parallel to said guiding member, said second mentioned member being slidable rearwardly of said gage parallel to said first mentioned member to insert a stop-off slug in a mold of a line-casting machine.

6. In an adjustable liner, a gage having one-half pica graduations and having surfaces adapted to fit against the front and ends of a line-casting mold, a carrier mounted to slide longitudinally of said gage and having a guiding member extending transversely rearwardly of said gage, a member spaced from and parallel to said guiding member, said second mentioned member being movable rearwardly of said gage parallel to said first mentioned member to lock said carrier to said gage.

7. In an adjustable liner, a gage having one-half pica graduations and having surfaces adapted to fit against the front and ends of a line-casting mold, a carrier mounted to slide longitudinally of said gage and having a guiding member extending transversely rearwardly of said gage, a member spaced from and parallel to said guiding member, said second mentioned member being slidable rearwardly of said gage parallel to said first mentioned member to insert said slug in a mold of a line-casting machine and to lock said carrier to said gage.

8. In an adjustable liner, a gage having graduations on the top side thereof and notches on the front edge thereof, a carrier slidable on said gage longitudinally thereof, a pair of fingers extending from said carrier rearwardly and having their adjacent sides parallel to each other, one of said fingers being stationary with respect to said carrier and the other finger being longitudinally movable transversely of said carrier and in its rearmost position fitting into said notches on said gage to lock said carrier to said gage.

9. In an adjustable liner, a gage having graduations on the top side thereof and notches on the front edge thereof, a carrier slidable on said gage longitudinally thereof, a pair of fingers extending transversely of said gage and rearwardly thereof and having their adjacent sides parallel, one of said fingers being stationary with respect to said carrier and having a stop at the end thereof to limit the movement of a stop-off slug with respect thereto, the other finger being longitudinally movable and when moved to its rearmost position operative to move said slug rearwardly over said carrier and to lock said carrier to said gage.

10. In an adjustable liner, a gage having graduations on the top side thereof and notches on the front edge thereof, a carrier slidable on said gage longitudinally thereof, a pair of fingers extending transversely of said gage and rearwardly thereof and having their adjacent sides parallel, one of said fingers being stationary with respect to said carrier and having a stop at the end thereof to position the rear edge of said slug in alinement with the rear surface of said mold, the other finger being longitudinally movable and when moved to its rearmost position operative to move a stop-off slug rearwardly over said carrier and to lock said carrier to said gage.

11. In an adjustable liner, a gage having one-half pica graduations and having surfaces adapted to fit against the front and ends of a line-casting mold, a carrier mounted to slide longitudinally of said gage and having a guiding member extending transversely rearwardly of said gage, a member spaced from and parallel to said guiding member, said second mentioned member being slidable rearwardly of said gage parallel to said first mentioned member to insert a stop-off slug in a mold of a line-casting machine and to lock said carrier to said gage.

12. In an adjustable liner, the combination of a gage adapted to be held adjacent the mold slot of a line casting machine and means adjustably mounted on said gage for inserting a stop-off slug in said slot.

13. In an adjustable liner, the combination of a gage adapted to be detachably secured adjacent the mold slot of a line casting machine, and means adjustably mounted on said gage for temporarily carrying a stop-off slug and inserting the same into the mold.

14. In an adjustable liner, the combination of a gage, means to retain the same adjacent the mold slot of a line casting machine and parallel thereto, a carrier slidable longitudinally of said gage and means to insert a stop-off slug into the mold at various positions indicated by the gage.

15. In an adjustable liner, the combination of a gage, means to hold said gage pressed against one end of a mold of a line-casting machine and parallel to the mold slot in said mold, a carrier slidable longitudinally of said gage, means to lock said carrier to said gage in different positions and means to insert a stop-off slug into the mold.

16. In an adjustable liner, a gage having one-half pica graduations, a carrier mounted to slide longitudinally of said gage, means to lock said carrier at any predetermined point on said gage in positions differing from each other in terms of one-half a pica and means to move said carrier transversely of said gage.

In witness whereof, I have hereunto set my hand this 17th day of November, 1915.

CHARLES A. SPICKLER.